(12) United States Patent
Meggiolan

(10) Patent No.: US 6,669,220 B2
(45) Date of Patent: Dec. 30, 2003

(54) INTEGRATED CONTROL AND POWER UNIT FOR USE ABOARD A BICYCLE

(75) Inventor: Mario Meggiolan, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 09/951,549

(22) Filed: Sep. 14, 2001

(65) Prior Publication Data

US 2002/0094474 A1 Jul. 18, 2002

(30) Foreign Application Priority Data

Sep. 15, 2000 (IT) ...................................... TO2000A0869
Oct. 31, 2000 (IT) ...................................... TO2000A1028

(51) Int. Cl.⁷ .............................................. B62K 19/40
(52) U.S. Cl. ..................... 280/288.4; 224/902; 224/929
(58) Field of Search .......................... 280/288.4, 304.5; 224/412, 414, 902, 926, 929; 180/68.5; D13/107, 108; 248/503; 362/157, 158, 183, 194, 195, 196, 197, 199, 203, 208

(56) References Cited

U.S. PATENT DOCUMENTS

| | | | |
|---|---|---|---|
| 675,390 A | * 6/1901 | Lyhne | ........................ 429/99 |
| 1,439,430 A | * 12/1922 | Keating | ........................ 429/97 |
| 3,995,491 A | 12/1976 | Wolfe, II | |
| 4,780,864 A | 10/1988 | Houlihan | |
| 4,948,080 A | 8/1990 | Jack | |
| 5,170,981 A | 12/1992 | Lin | |
| 5,177,432 A | 1/1993 | Waterhouse et al. | |
| 5,199,619 A | 4/1993 | Mostashari | |
| 5,217,116 A | 6/1993 | Ku | |
| 5,276,593 A | * 1/1994 | Lighthill et al. | ............ 362/473 |
| 5,423,509 A | 6/1995 | LaPorte et al. | |
| 5,570,752 A | * 11/1996 | Takata | ........................ 180/206 |
| 5,597,225 A | 1/1997 | Davis | |
| 5,803,328 A | 9/1998 | Nakahara | |
| 6,095,270 A | * 8/2000 | Ishikawa | .................... 180/68.5 |
| 6,286,982 B1 | * 9/2001 | Tashiro | ........................ 362/474 |
| 6,423,443 B1 | * 7/2002 | Tsuboi et al. | .................. 429/98 |
| 2001/0042767 A1 | * 11/2001 | Campagnolo | ............... 224/414 |
| 2002/0052258 A1 | * 5/2002 | Meggiolan | .................... 474/70 |

FOREIGN PATENT DOCUMENTS

JP            2002193164 A    *  7/2002   ............ B62J/11/00

* cited by examiner

Primary Examiner—Daniel G. DePumpo
Assistant Examiner—Daniel Yeagley
(74) Attorney, Agent, or Firm—Volpe and Koenig, P.C.

(57) ABSTRACT

A housing (2) for an electronic control unit for use aboard a bicycle and a battery container (3) for powering electrical devices fitted aboard, are provided with quick coupling means (6, 10), that, when coupled, also provide the electrical connection between the batteries and the control unit.

8 Claims, 7 Drawing Sheets

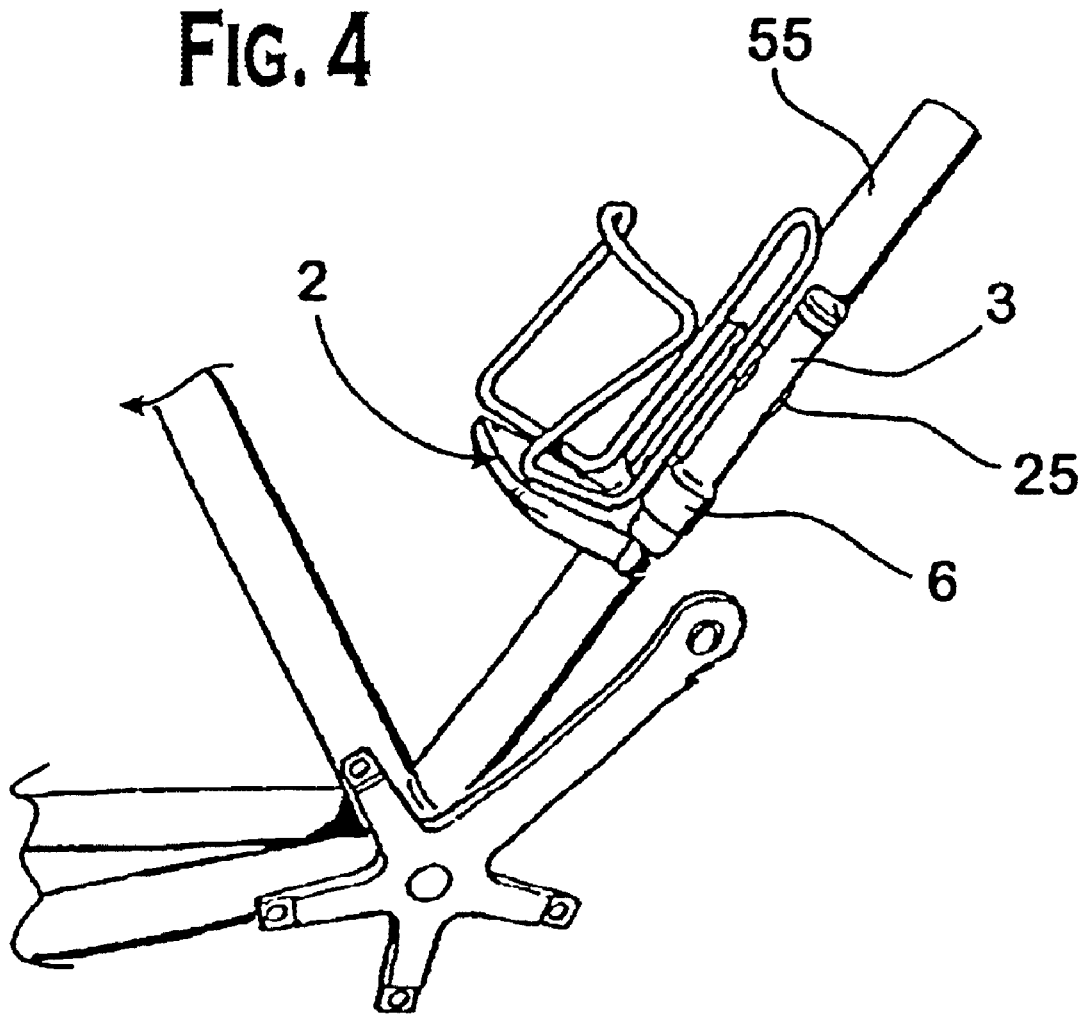

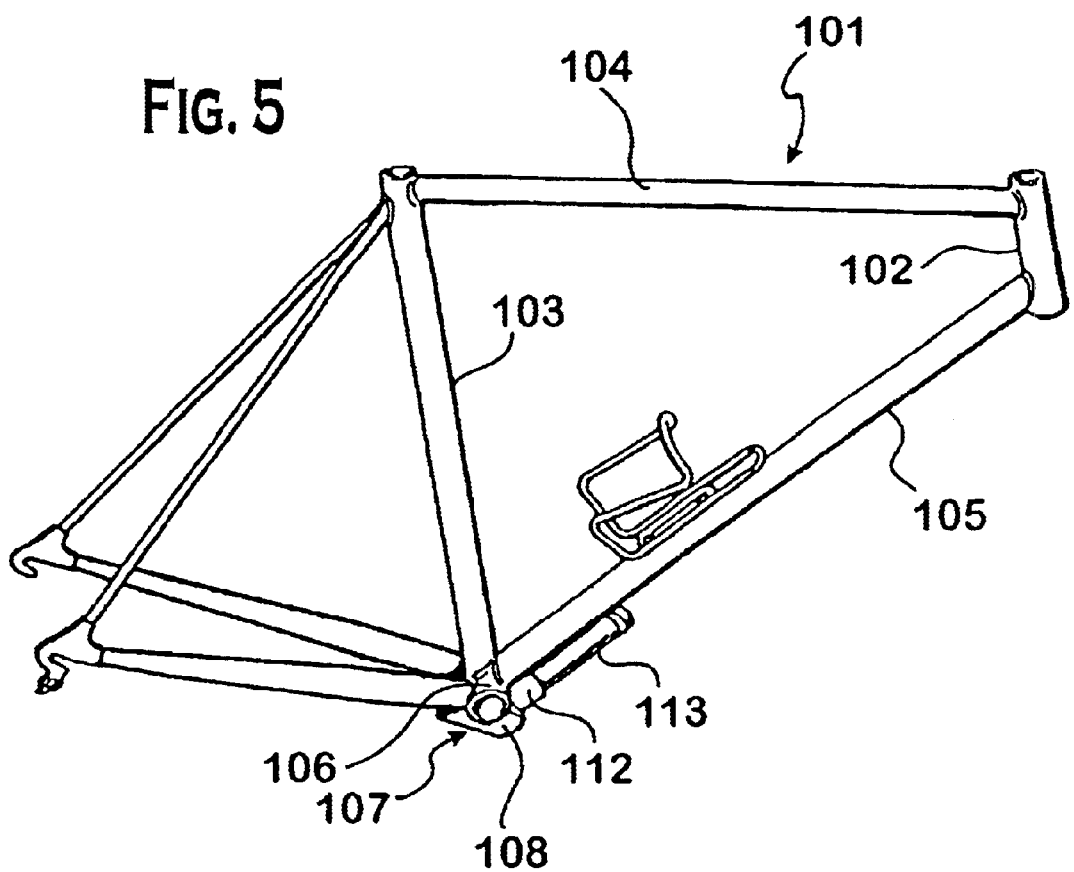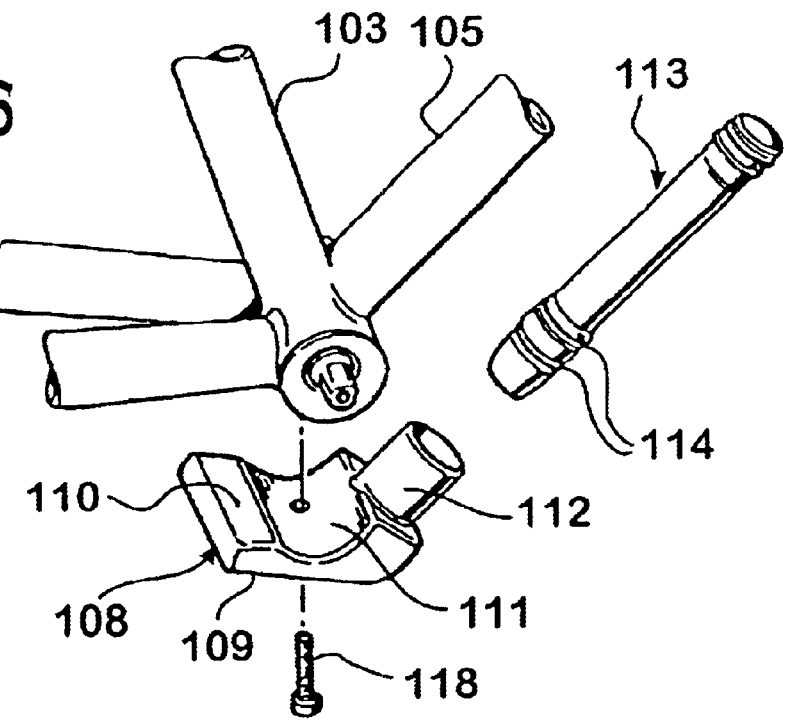

INTEGRATED CONTROL AND POWER UNIT FOR USE ABOARD A BICYCLE

BACKGROUND OF THE INVENTION

This invention relates to an integrated control and power unit for use aboard a bicycle, comprising a housing for an electronic control unit and a holder container for one or more batteries for powering electrical devices fitted aboard the bicycle.

A device of this kind has been disclosed in Italian Patent Application No. TO2000A000430 filed by the Applicant on May 9, 2000 and still secret at the filing date of this application.

SUMMARY OF THE INVENTION

The object of this invention is to improve the previously proposed unit, making it increasingly simpler and more functional.

In order to attain this object, this invention relates to a unit, having the above specified features, and additionally characterised in that said housing of the control unit and said battery holder container are provided with quick coupling means, that, when coupled, also provide the electrical connection between the batteries and the control unit.

Due to these features, battery holder container can be assembled and electrically connected in an extremely simple and rapid manner. This advantage is very important, especially when needing to fully replace the battery holder container during a cycling competition. In general, however, as specified below, the container will not be replaced, but simply temporarily removed for recharging.

In a preferred embodiment, said quick coupling means comprise a circular seat, formed in the body of the housing of the control unit, and a cylindrical end portion of the battery holder, which can be received within this seat. Obviously, however, other coupling means can be made in an equivalent fashion by reversing the male and female functions on the battery holder container and on the housing of the control unit.

Always in the case of said preferred embodiment, the external surface of the cylindrical end portion of the battery holder has one or more electrical contacts leading to the batteries and suitable for engaging corresponding electrical contacts in said seat, once said coupled condition is obtained.

According to an additional preferred characteristic, each of said electrical contacts on the external surface of the cylindrical end portion of the battery holder container consists of a ring of conductive material surrounding said cylindrical portion. At the same time, each of said contacts arranged in the seat for the battery holder container includes a pin, which is elastically biassed towards a position radially projecting within this seat.

Due to these characteristics, both the mechanical and electrical coupling is obtained for any angular position of the cylindrical portion of the battery holder container within its seat.

According to an additional preferred characteristic, said ring forming each electrical contact on the battery holder container has an external surface defining a round recess for receiving and axially locking the respect contact pin in the seat receiving the battery holder container. In this way, said contact pins also perform a mechanical retaining function.

Preferably, the battery, or the batteries, are rechargeable. The container in which they are housed is hermetically closed and the batteries can be recharged by placing this container in a specifically dedicated seat in a battery charger, which is totally similar to the seat in the housing of the electronic control unit. In this way, the batteries do not need to be removed from the container for recharging.

According to yet another characteristic, the battery holder container comprises a entirely cylindrical elongated body closed on one end and equipped with a closing cap on the opposite end. A coil spring is arranged between the batteries and the closed end of the container to dampen all vibrations (and the consequent noise) of the batteries inside the container.

Any number of electrical contacts can be provided, because accessory terminals can be arranged, in addition to the two power terminals.

BRIEF DESCRIPTION OF THE DRAWINGS

This invention will be better explained by the following detailed description with reference to the accompanying figures as non-limiting example, wherein:

FIG. 4 is a parallel perspective view of the frame of the bicycle having a unit according to the invention mounted thereon, FIG. 5 is a perspective view of a bicycle frame with a second embodiment of the unit according to the invention, FIG. 6 is an exploded perspective view, at an enlarged scale, of a detail of FIG. 5.

DETAILED DESCRIPTION OF THE INVENTION

Figure 1:
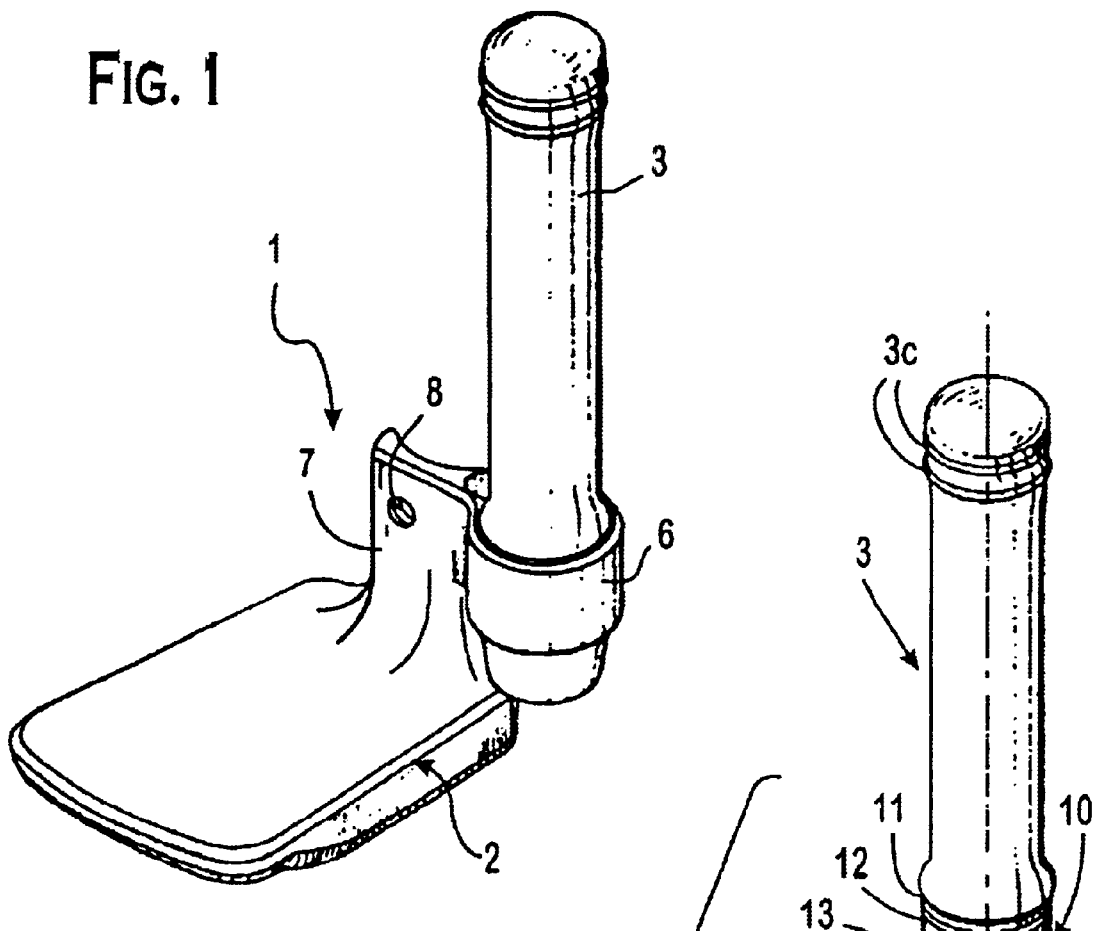
FIG. 1 is a perspective view of the unit according to this invention illustrated in a mounted condition.
Figure 2:
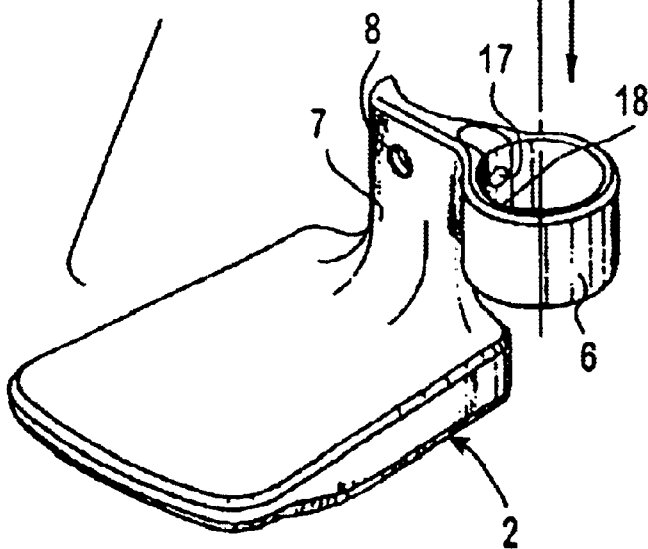
FIG. 2 is a perspective view of the unit shown in FIG. 1 illustrated in a disconnected condition.

With reference to FIGS. 1, 2, numeral 1 generally indicates an integrated control and power unit usable aboard a bicycle, comprising a housing 2 containing one or more electronic circuit boards forming the electronic control unit, i.e. the bicycle on-board computer, as well as a cylindrical container 3 holding one or more batteries for powering the various electrical devices aboard the bicycle. The battery holder container 3 comprises a lower end portion 10, which is received in an annular cylindrical seat 6, forming an integral part of the body of the housing 2. In the example shown, the annular seat 6 projects from a riser 7 extending vertically upwards from one end of the box 2, which is substantially flat and rectangular. Naturally, the specific conformation of the housing 2 and the container 3 illustrated in the drawings as non-limiting examples can be widely varied. The riser 7 of the housing 2 presents a hole 8 for engaging a screw for fastening the housing to the bicycle frame, for example, according to the technique illustrated in the aforesaid Italian Patent Application by the Applicant, i.e. at the fastening holes formed in a tube of the bicycle frame, and used for mounting the bottle-cage.

Figure 3:
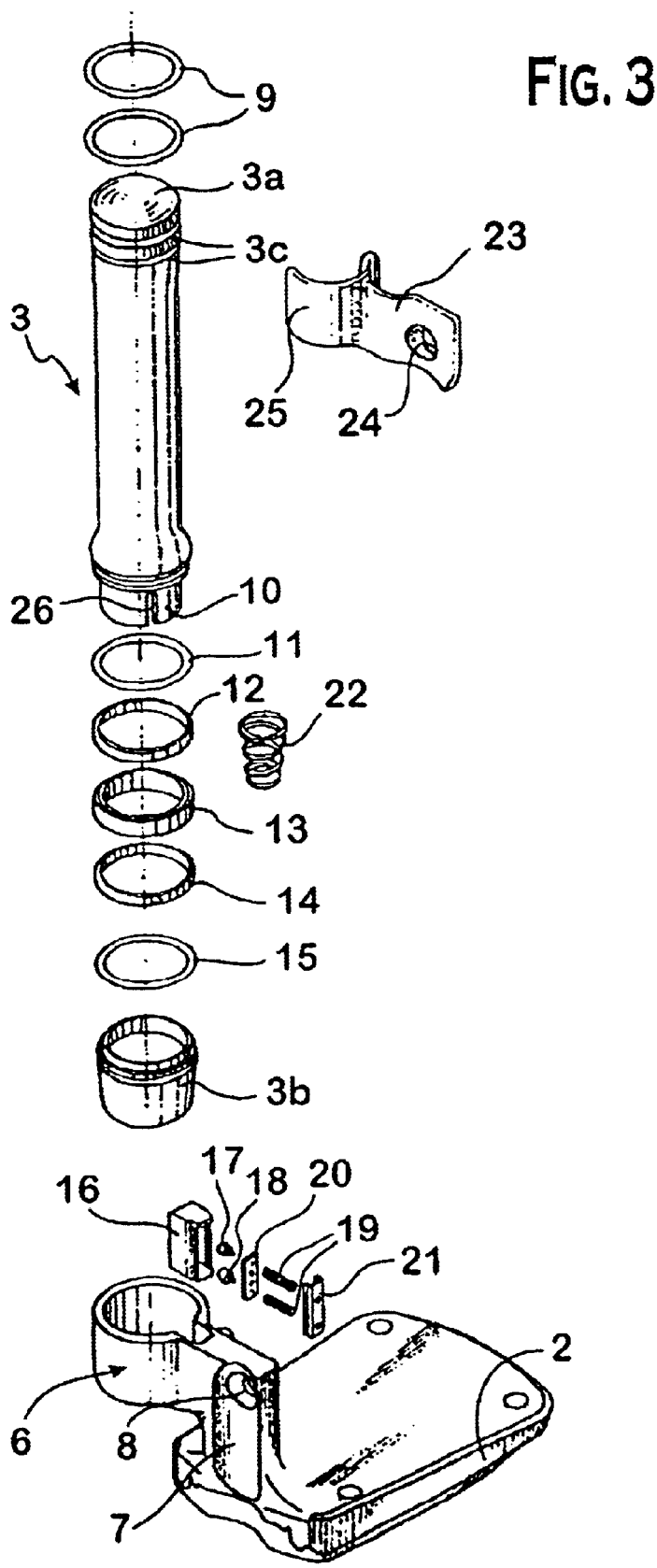
FIG. 3 is a perspective exploded view of the unit according to this invention.

With reference to FIG. 3, the battery holder container 3 presents an elongated tubular cylindrical conformation, which is closed on one end by a partition 3a and on the opposite end by a cap 3b, which is clipped on and welded to the body of the container 3, such elements being both made of plastic insulating material. The container 3 has two round grooves 3c on the upper end, which receive two circular cross-section rubber rings 9, suitable for grasping easily the upper end of the container 3. On the lower end, the container 3 presents a cylindrical portion 10, which is to be received inside the seat 6. A circular cross-section rubber ring 11, a metallic conductive material ring 12, a plastic material shim ring 13, an additional metallic conductive material ring 14, an additional rubber ring 15 and finally a cap 3b are arranged in sequence on the cylindrical portion 11. The two metallic rings 12, 14 are reciprocally isolated and form two electrical contacts which are respectively connected to the two terminals of the battery, or of the batteries, arranged inside the container 3. This connection is attained by means the respective conductor wires, or metallic reeds, which are arranged inside the container 3, and which project from the container through a slot 26, arranged in the cylindrical portion 10 so as to be connected to the two rings 12, 14. As mentioned, however, any number of electrical contacts can be arranged. The two rubber rings 11, 15 ensure tightness, preventing infiltration of water in the area of the electrical contacts 3. As mentioned, the cap 3b is permanently welded to the container 3 after inserting the batteries. The latter can be made according to any known technique and are rechargeable.

As appears in FIG. 3, an axial recess 6a is provided on the inner surface of the annular seat 6 in which a guiding box 16 for two ball headed metallic pins 17, 18 which are biased by coil springs 19 towards a radially projecting position inside the annular housing 6. The pins 17, 18 form two electrical contacts suitable for establishing contact with the two rings 12, 14 of the battery holder container when the latter is inserted in the seat 6. The springs 19 are arranged between a movable plate 20 with two pins 17, 18 and a counter plate 21 which is secured to an end of the housing 16.

When the battery holder container 3 is received in the seat 6, the two rings 12, 14 establish contact with the two contact pins 17, 18 (also see FIG. 2). Preferably, the external surface of the ring 12 and the ring 14 is formed to present a circumferential groove with a rounded cross-section, to provide an axial retention with respect to the contact pins 17 or 18. In this way, the two pins 17, 18 ensure both the mechanical connection and the electrical connection. The surface thus formed of each ring 12, 14 also produces a cam effect with determines the retraction of the pins 17, 18 when the battery holder container 3 is extracted.

As mentioned, the battery, or the batteries, arranged in the container 3 rest against the end 3a of the container with a coil spring 22 arranged in-between, preventing movements inside the container.

FIG. 3 illustrates an additional supporting element of the container 3 on the bicycle frame, comprising a plate 23 with a hole 24 for engagement of a fastening screw to be screwed into a hole of a tube of the bicycle frame and a semicircular grip 25 for engaging the container 3 laterally. The screws engaging the holes 24 and 8 can engage, for example, the two holes usually provided in a tube of the bicycle frame for attaching the bottle-cage of the bicycle, according to the concept disclosed in the aforesaid previous Italian Patent Application by the Applicant (see FIG. 4). Thus, the same screws are used to attach both the bottle-cage and the unit of the invention.

FIG. 4 depicts the control and power unit according to the preferred embodiment of the present invention mounted on a down tube 55 of a bicycle frame.

In FIG. 5, numeral 101 generally designates a bicycle frame, including a front steering tube 102 which is connected to a rear saddle tube 103 through a horizontal tube 104 and a diagonal tube 105. Tubes 103, 105 converge into a housing 106 for the bicycle crank axle, having a substantially cylindrical shape with a horizontal axis (with reference to the condition of use of the bicycle).

Reference numeral 107 generally designates an electronic control unit according to the invention, including a rigid housing 108 for housing one or more electronic circuit boards for controlling one or more electronic components mounted on board the bicycle.

With reference to FIG. 6, the housing 108 has a substantially flattened shape, with a lower surface 109 which is substantially planar and an upper surface 110 including a cradle-like portion 111 of curved shape which is for engaging the lower surface of the housing 106 while keeping the dimension of the housing 108 along the vertical direction at the minimum. The housing 108 further comprises a tubular body 112 acting as a seat for a quick mechanical and electrical coupling with the lower end of a cylindrical holder container 113 containing the batteries. The holder 113 is sealed and has two outer metal rings 114 at its lower end, which are insulated from each other, acting as contacts and adapted to co-operate with the two contact pins (not shown in FIG. 6) provided within the seat 112 and biased radially inwardly by spring means, in a manner similar to what has been disclosed with reference to the first embodiment of the invention.

Figure 7:
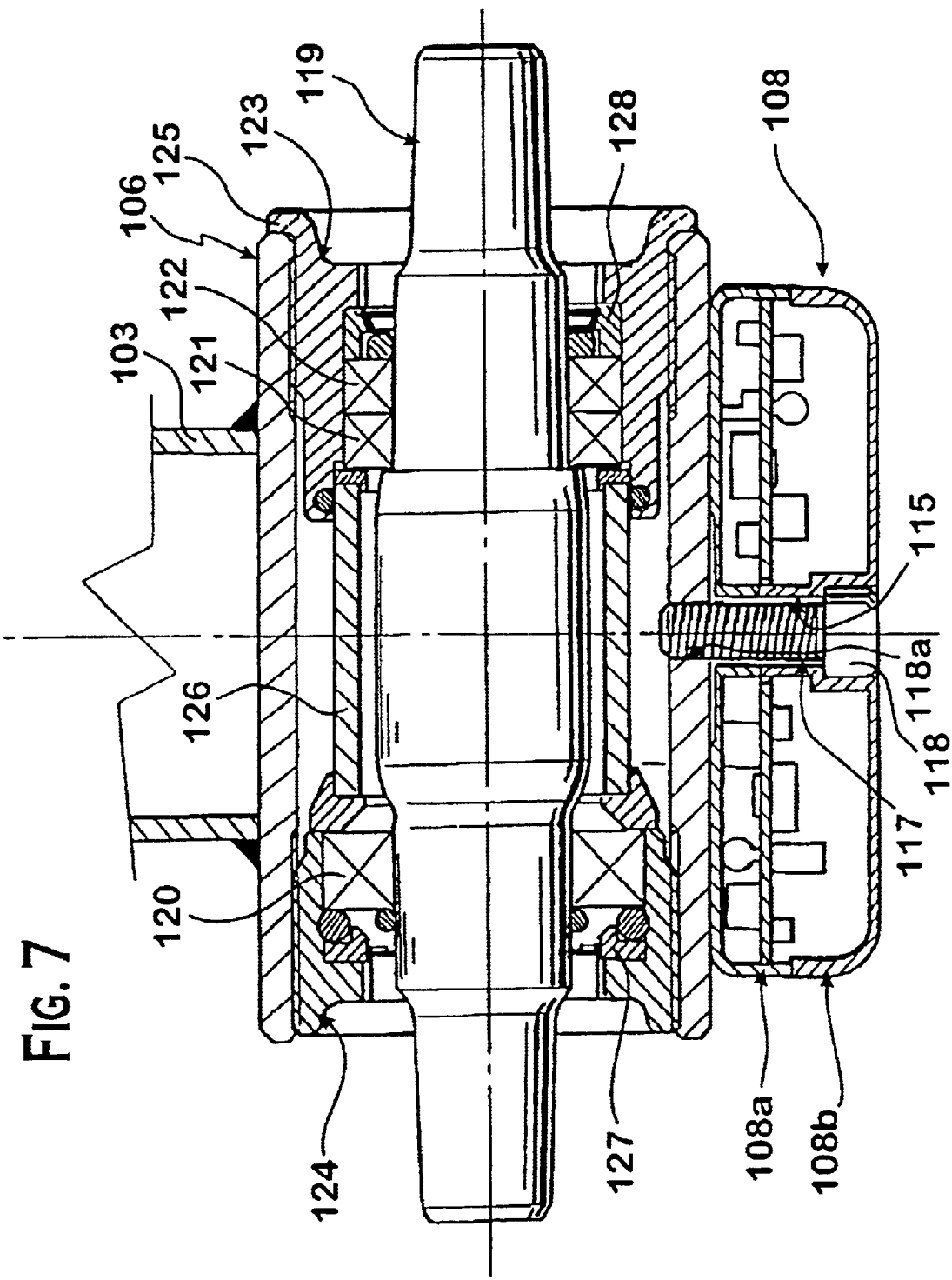
FIG. 7 is a cross-section view of the device according to the invention as shown in FIGS. 5, 6, in its mounted condition.

With reference to FIGS. 6, 7 the housing 108 is constituted by a body including an upper half-shell 108a and a lower half-shell 108b both made of plastic material and connected to each other (e.g. by welling). These half-shells together define a through hole 115 having a cylindrical surface 117, for engagement of a screw 118 serving for fastening the housing 108 to the housing 106 of the crank axle. The screw 118 is engaged within a threaded hole 118a of the housing of the crank axle which is conventionally provided, unconventional bicycles, for fastening a guiding plate which guides the cables controlling the front and rear derailleurs, where the bicycle is provided with a derailleur manual control device. FIG. 7 shows the housing 106 in cross-section. Inside housing 106 there is arranged a crank axle 119 which is rotatably abutment through rolling bearings 110, 121, 122 by two threaded bush 123, 124 which are screwed within the housing 106. The bush 123 has an enlarged head 125 which comes into abutment against one end surface of the housing 106, whereas the bush 124 is received completely inside the housing 106 and presses a tubular spacer 126 against the assembly of bearings 121, 122 which is supported by the other bush 123. According to a technique known per se, sealing rings 127, 128 are further associated to bearings 120, 121 and 122.

Figure 8:
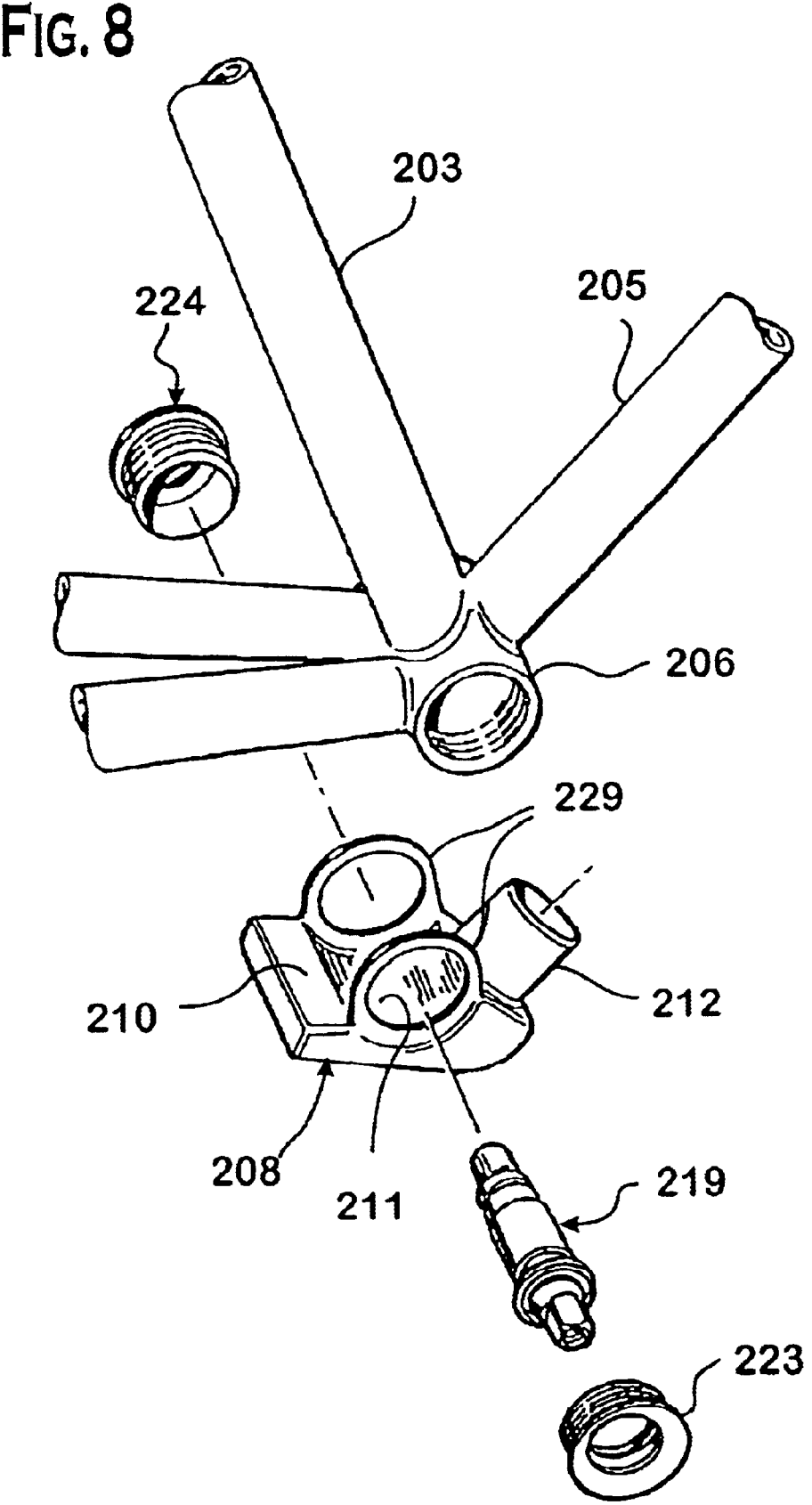
FIGS. 8, 9 show variants of FIGS. 6, 7 with reference to further version of device according to the invention.
Figure 9:
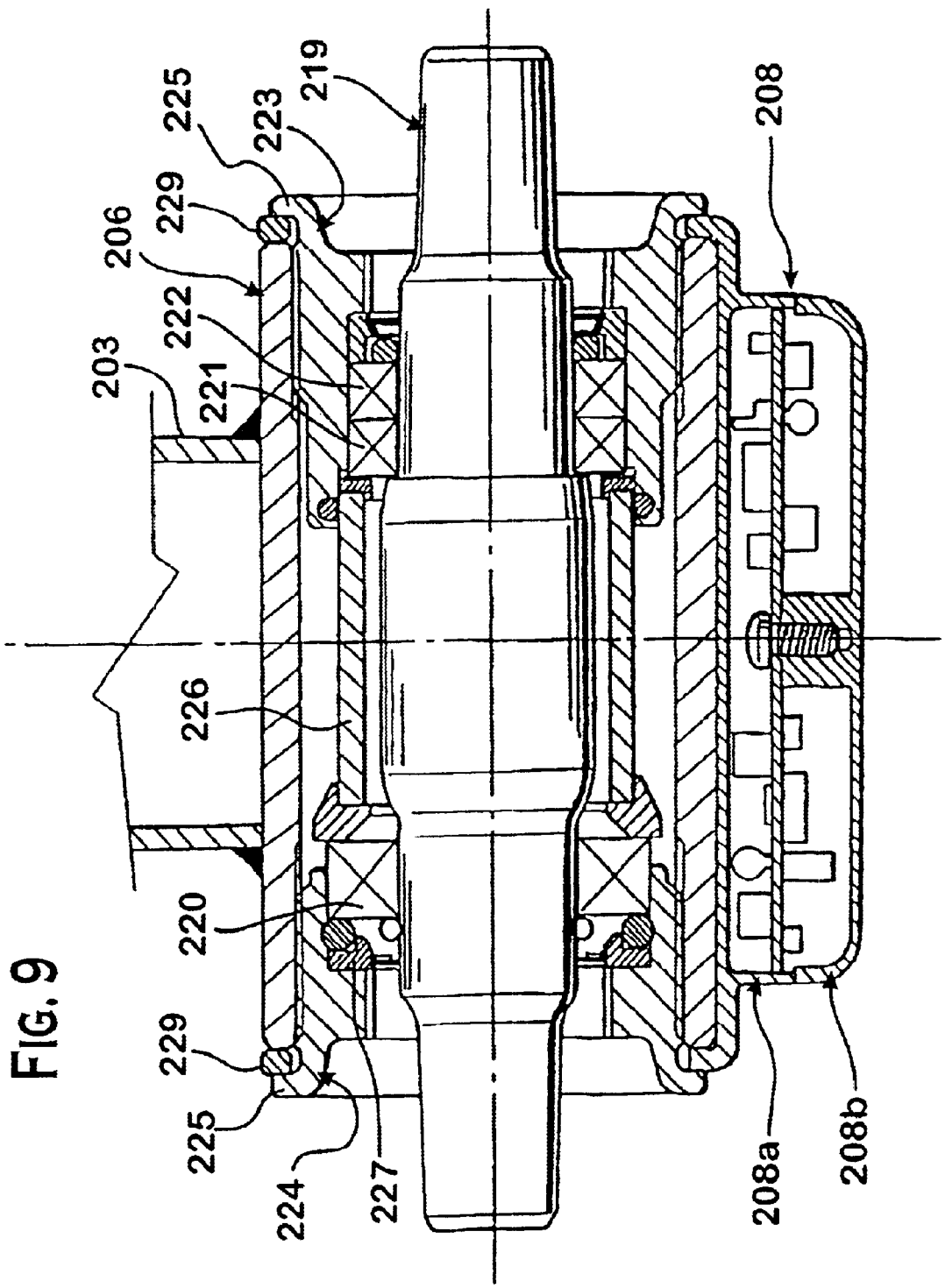

FIGS. 8, 9 refer to a further version of the device according to the invention, in which fastening of the housing 208 to housing 206 is obtained in a different manner. In this case, the housing 208 incorporates two annular ears 229 which are parallel and spaced apart from each other and project upwardly from the upper surface 210 of the housing 208 and are arranged in planes perpendicular to the axis of the crank axle, with reference to the mounted condition on the bicycle. The two ears 229 are secured against the respective ends of the housing 206 of the crank axle by means of the two above-mentioned threaded bushes 223, 224 (FIG. 9). In this case, however, as shown in FIG. 9, both threaded bushes 223, 224 have an enlarged head 225 and the two ears 229 are each mounted around the respective bush 223 and 224, between the respective enlarged head 225 and the respective end surface of the housing 206.

As clearly apparent from the foregoing description, the control unit according to the invention is adapted to be secured to bicycle frame at a position which is not of hindrance to the normal use of a bicycle while enabling an easy access for carrying out maintenance or replacement operations, or for removing and mounting the battery holder before each recharging operation.

Naturally, numerous changes can be implemented to the construction and embodiment of the invention described herein without departing from the scope of the present invention, as defined by the following claims.

What is claimed is:

1. An integrated control and power unit, for use on a bicycle, comprising:

a housing for an electronic control unit;

a holder container, for at least one battery for powering electrical devices mounted on the bicycle, which includes a cylindrical end portion having at least one ring of electrical conductive material forming an external electrical contact for connection with the at least one battery;

a circular seat attached to the housing, having at least one internal electrical contact for connection with the electronic control unit, which receives the cylindrical end portion to quickly couple the holder container to the housing and provide an electrical connection between the internal and external contacts;

wherein, the at least one internal contact includes a contact pin which is elastically biased towards a position radially projecting within the seat.

2. The unit according to claim 1, wherein the at least one ring has an external surface defining a circumferential groove for receiving and axially retaining the contact pin.

3. The unit according to claim 1, wherein the holder container comprises an elongated tubular body closed on one end and equipped with a closing cap on an opposite end.

4. The unit according to claim 3, wherein the at least one battery arranged in the container rests against a closed end of the container with a coil spring arranged in-between preventing movements inside the container.

5. The unit according to claim 1, wherein the batteries are rechargeable.

6. The unit according to claim 1, wherein the seat consists of an annular cylindrical appendage projecting from a riser, projecting in turn orthogonally from an end of the electronic control unit housing, said housing having a generally flattened rectangular shape.

7. An integrated bicycle control and power unit comprising:

a housing for an electronic control unit;

a battery holder that includes a cylindrical end portion having at least one ring of electrical conductive material forming an external electrical contact for connection with a battery contained in the holder;

a circular seat attached to the housing, having at least one internal electrical contact that includes an elastically biased contact pin for connection with the electronic control unit, which receives the cylindrical end portion to quickly couple the holder to the housing and provide an electrical connection between the internal and external contacts.

8. The unit of claim 7 wherein the ring has an external surface defining a circumferential groove for receiving and axially retaining the contact pin.

* * * * *